(No Model.) 4 Sheets—Sheet 1.
J. P. MANTON.
SHIP'S WINDLASS.

No. 569,110. Patented Oct. 6, 1896.

Witnesses:
Walter H. Wales
Henry E. Reynolds

Inventor.
Joseph P. Manton
By S. Scholfield
Attorney.

(No Model.) 4 Sheets—Sheet 2.

J. P. MANTON.
SHIP'S WINDLASS.

No. 569,110. Patented Oct. 6, 1896.

Witnesses:
Walter H. Wales
Henry E. Reynolds

Inventor.
Joseph P. Manton
By S. Schofield
Attorney.

(No Model.) 4 Sheets—Sheet 3.

J. P. MANTON.
SHIP'S WINDLASS.

No. 569,110. Patented Oct. 6, 1896.

Witnesses:
Walter H. Wales
Henry E. Reynolds

Inventor.
Joseph P. Manton
By J. Scholfield
Attorney.

(No Model.) 4 Sheets—Sheet 4.

J. P. MANTON.
SHIP'S WINDLASS.

No. 569,110. Patented Oct. 6, 1896.

Witnesses:
Walter H. Wales
Henry E. Reynolds

Inventor.
Joseph P. Manton
By S. Scholfield
Attorney.

UNITED STATES PATENT OFFICE.

JOSEPH P. MANTON, OF PROVIDENCE, RHODE ISLAND.

SHIP'S WINDLASS.

SPECIFICATION forming part of Letters Patent No. 569,110, dated October 6, 1896.

Application filed August 19, 1895. Serial No. 559,833. (No model.)

*To all whom it may concern:*

Be it known that I, JOSEPH P. MANTON, a citizen of the United States, residing at Providence, in the State of Rhode Island, have invented a new and useful Improvement in Ships' Windlasses, of which the following is a specification.

My invention relates to a ship's windlass operated by steam-power; and it consists in certain improved details of construction, as hereinafter fully set forth.

Figure 1:
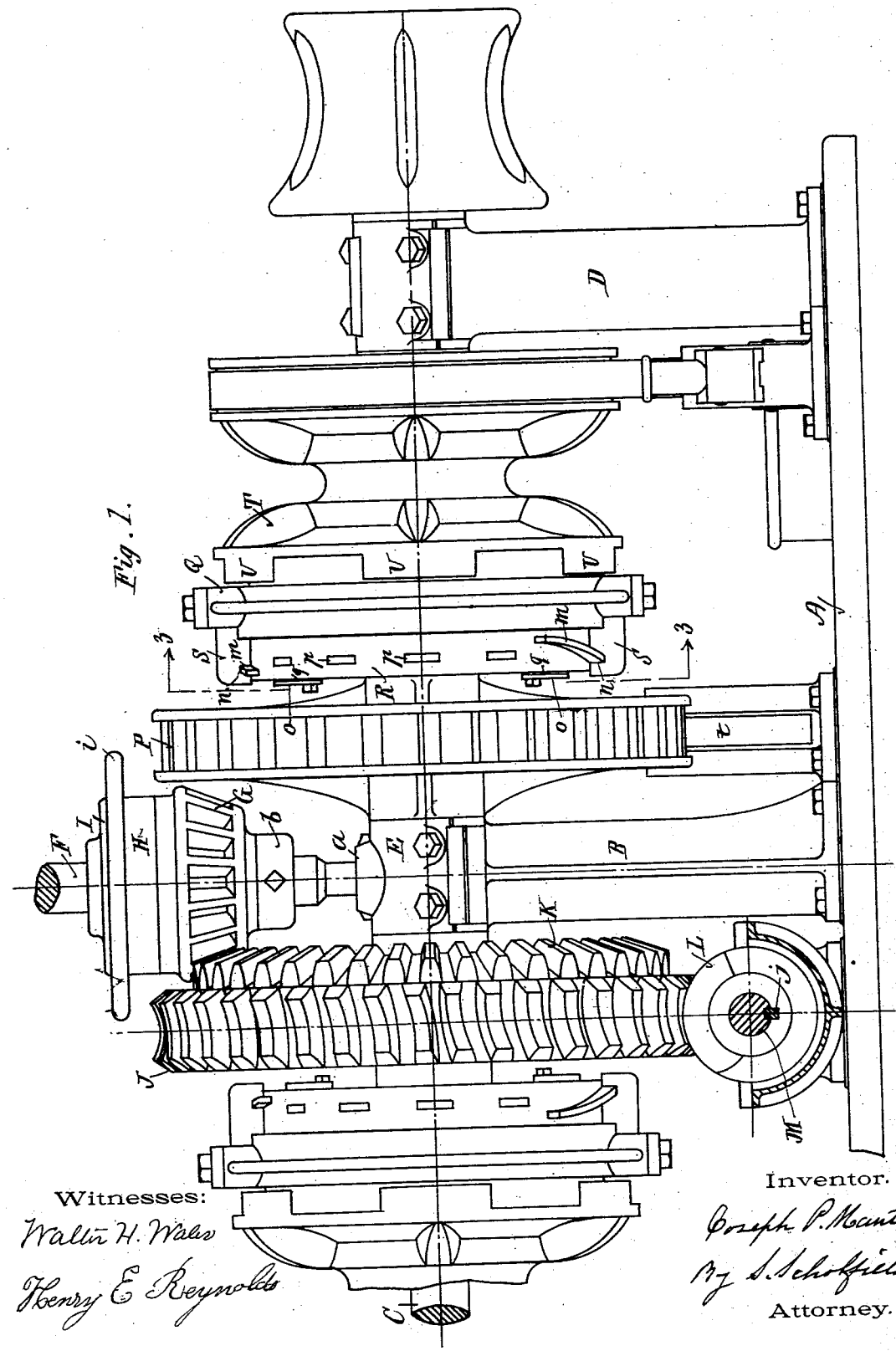
Figure 2:
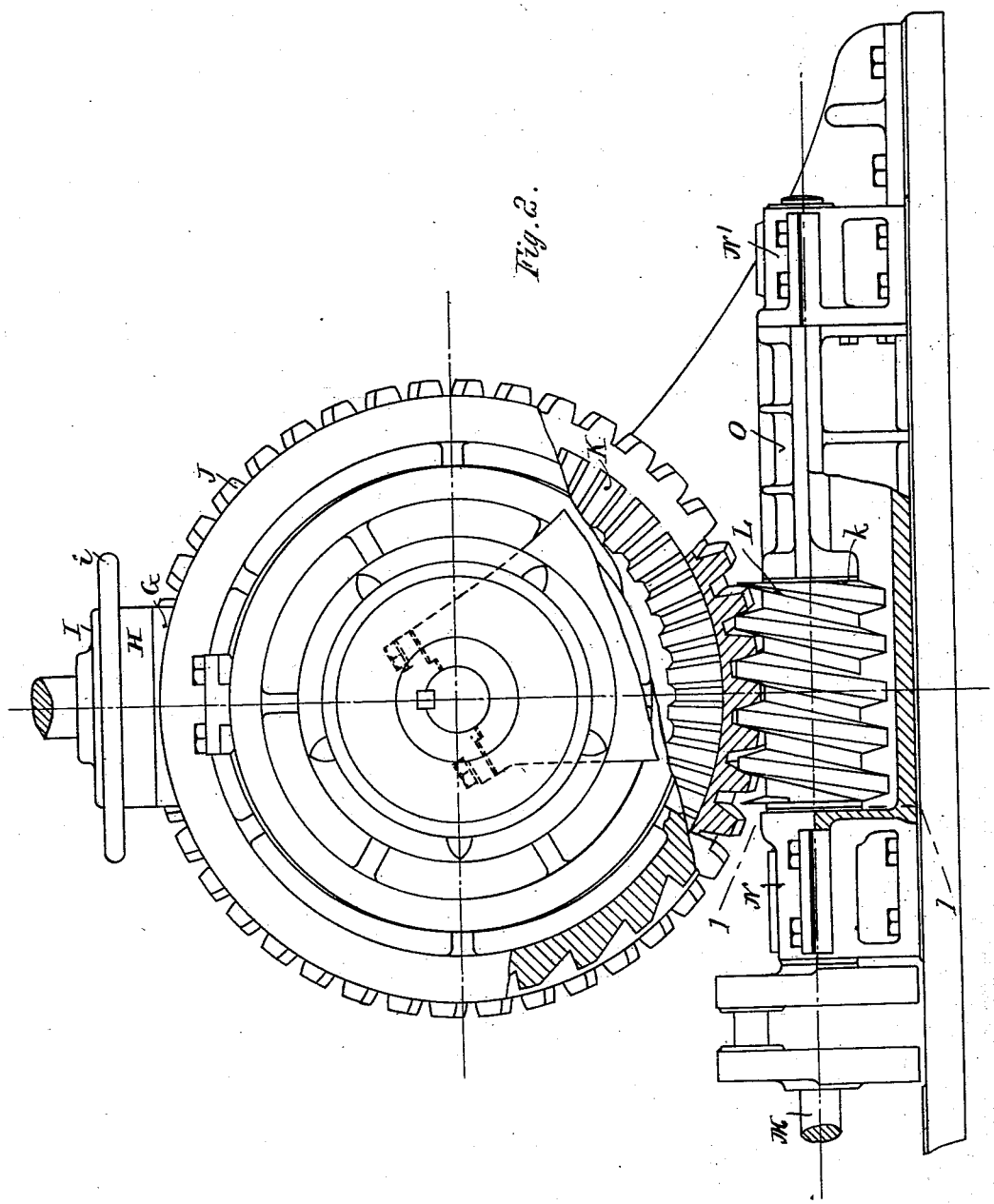
Figure 3:
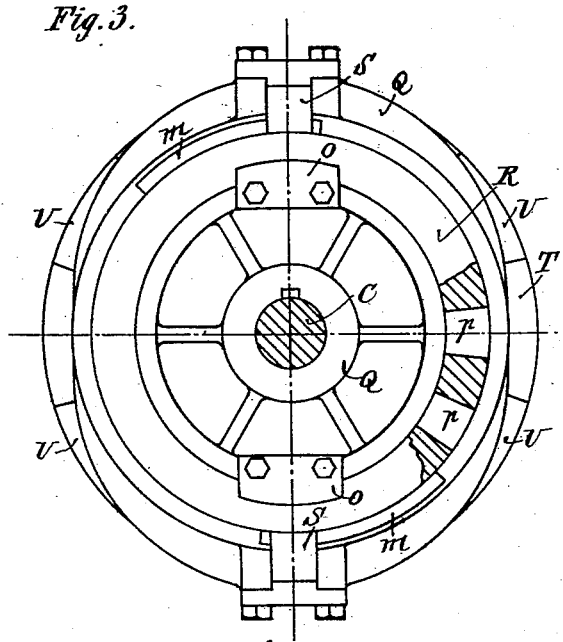
Figure 4:
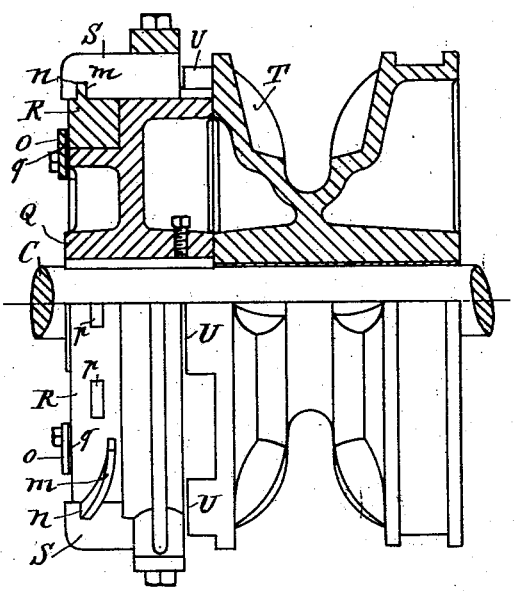
Figure 5:
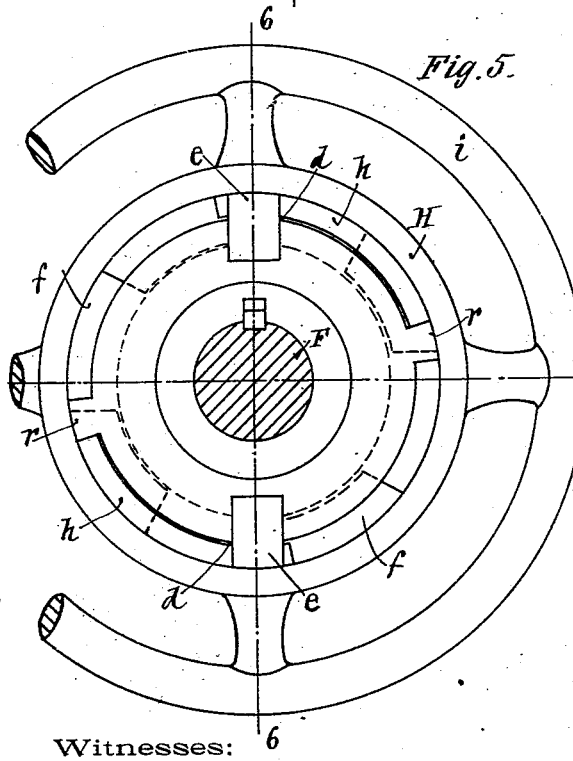
Figure 6:
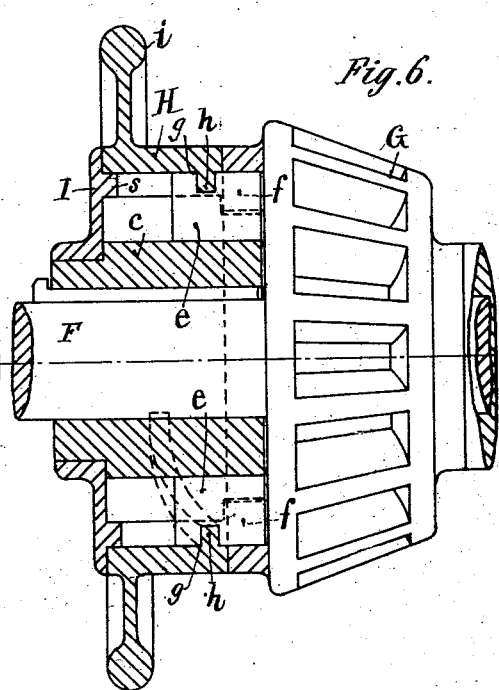
Figure 7:
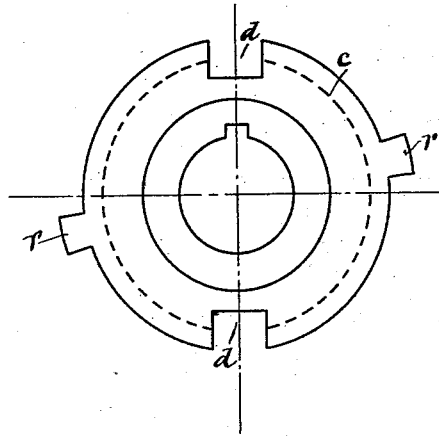
Figure 8:
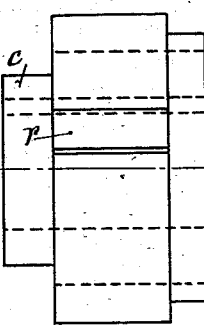
Figure 9:
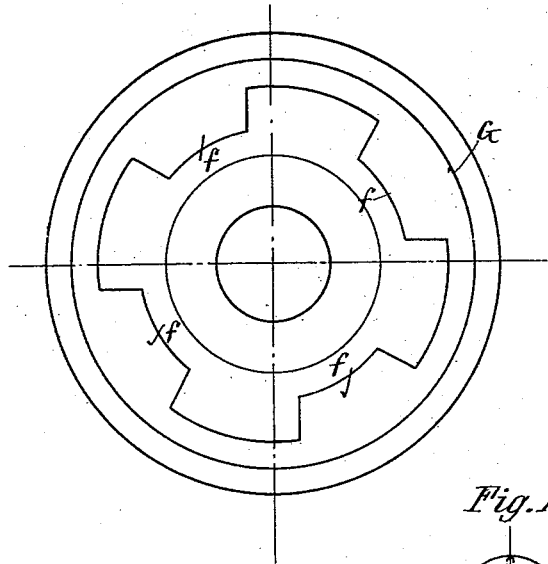
Figure 10:
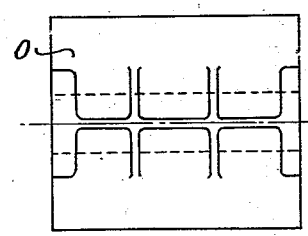
Figures 11, 12:
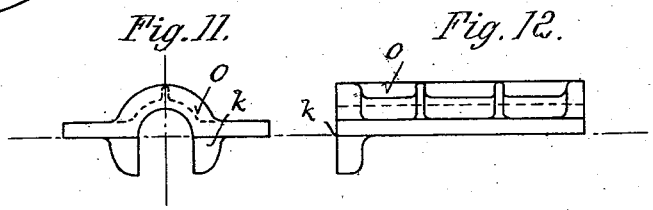

In the accompanying drawings, Figure 1 represents a partial side elevation of a ship's windlass provided with my improvement. Fig. 2 represents a partial end elevation with portions broken away to show the hidden parts. Fig. 3 represents a vertical section taken in the line 3 3 of Fig. 1. Fig. 4 represents a detail side elevation and partial section of the wildcat and the clutch. Fig. 5 represents an enlarged detail section showing a top view of the clutch for engaging and disengaging the capstan-shaft. Fig. 6 represents an enlarged side view and partial axial section, taken in the line 6 6 of Fig. 5, showing the bevel-pinion and the clutch mechanism which serves to operate the capstan-shaft, the said shaft being in the figure turned from its vertical to a horizontal position. Fig. 7 represents an enlarged end view, and Fig. 8 a side view, of the clutch-head employed on the capstan-shaft. Fig. 9 represents an enlarged top view of the pinion on the capstan-shaft. Fig. 10 represents an enlarged top view, Fig. 11 an end view, and Fig. 12 a side view, of the covering-cap employed to fill the space between the worm on the driving-shaft and the bearing-box.

In the drawings, A represents the bed-plate of the windlass, B the central upright standard, which forms a bearing for the shaft C, and D one of the end bearing-standards. The similar bearing-standard for the opposite end of the shaft C is not shown in the drawings. The cap E of the bearing-standard B forms a step $a$ for the upright shaft F of the capstan, the said shaft being provided with the adjustable collar $b$, above which is placed the loose bevel-pinion G, which serves, in conjunction with the bevel-gear on the windlass-shaft, to transmit rotary movement to the capstan-shaft, the said pinion G being thrown into and out of engagement with the capstan-shaft by means of a clutch arranged upon the shaft F above the pinion G, the said clutch consisting of the clutch-head $c$, keyed to the shaft F and provided with the longitudinal flanges $r\,r$ and the intermediate longitudinal grooves $d\,d$, the said grooves being adapted to receive the sliding clutch-bolts $e\,e$, which engage with the inwardly-projecting lug portions $f\,f$ at the upper side of the pinion G. The sliding clutch-bolts $e\,e$ are provided with the notches $g\,g$, the said notches being engaged by the inclined cams $h\,h$, which extend partially around the inner side of the annular shell H, the said shell being provided with the hand-rim $i$, by means of which a partial revolution may be imparted to the shell H over the clutch-head $c$. The shell H is supported for revolution by means of its bearing upon the outer faces of the flanges $r\,r$ and upon the flange $s$ of the annular plate I, which is secured to the clutch-head $c$, so that upon the movement of the annular shell H in the proper direction the sliding bolts $e\,e$ may be thrown into or out of engagement with the clutch-lugs $f\,f$ of the pinion G, and by means of this hand-operated clutch mechanism motion may be imparted from the windlass-shaft C to the capstan-shaft F.

Upon the shaft C of the windlass is keyed the worm-gear J, on the side of which is cast the bevel-gear K, which engages with the pinion G on the capstan-shaft F, the said worm-gear being driven by means of the worm L upon the driving-shaft M, the said worm being held for revolution with the shaft M by means of the spline $j$. The worm L is adapted to slide upon the shaft M between the bearing-boxes N N', and is retained in its engaging position with the worm-gear J by means of the loosely-removable cap O, which rests over the shaft M in the space between the end $k$ of the worm L and the face of the bearing-box N', and upon lifting the cap O from its position over the shaft M the worm L may be thrown out of engagement with the worm-gear by sliding the worm upon the shaft M until it strikes the face of the bearing-box N'. The windlass can then be operated by hand, being prevented from backward movement by means of the ratchet-wheel P, keyed to the shaft C, and the pawls $t\ t$ as usual. Upon the shaft C is keyed the clutch-head Q, upon the peripheral outer edge of which is placed the cam-ring R, the said ring being provided on its periphery with the inclined cams $m\ m$, which engage with the notches $n\ n$ at the inner side of the sliding clutch-bolts S S, which are held in the clutch-head, the said ring R being held in position for movement on the clutch-head Q by means of the flat plates $o\ o$, which are secured to the side of the clutch-head Q by means of screws.

The wildcat T of the windlass is provided at its side with the projecting lugs U U, which are adapted to engage with the sliding clutch-bolts S S when the said clutch-bolts have been brought forward by turning the cam-ring R on the clutch-head Q, suitable openings $p\ p$ being made in the periphery of the ring R for the insertion of a handspike for imparting the required rotary movement to the ring, the ring R being held in its set position by means of the friction-pad $q$, inserted between the plate $o$ and the side of the cam-ring R. The movement of the cam-ring will serve to effect the engagement and disengagement of the wildcat T relatively to the driven shaft C.

I claim as my invention—

1. In a ship's windlass, the combination of the worm-gear upon the windlass-shaft, with the driving-shaft, and bearing-boxes, the slidable worm engaging with the worm-gear, and the removable cap resting over the shaft, in the space between the end of the worm, and the face of the bearing-box, substantially as described.

2. In a ship's windlass, the combination of the windlass-shaft C, and the loose wildcat T, provided with the projecting clutch-lugs V, with the clutch-head Q, keyed to the windlass-shaft, the cam-ring R, provided with the openings $p$, the inclined cams $m$, upon the periphery of the cam-ring, the holding-plates $o$ provided with the friction-pads $q$, and the sliding clutch-bolts S, held in the clutch-head Q, and provided with the notches $n$, for engagement with the operating-cams, substantially as described.

JOSEPH P. MANTON.

Witnesses:
SOCRATES SCHOLFIELD,
WALTER H. WALES.